(12) United States Patent
Tarui

(10) Patent No.: US 9,793,840 B2
(45) Date of Patent: Oct. 17, 2017

(54) MOTOR CONTROL APPARATUS

(71) Applicant: DENSO CORPORATION, Kariya, Aichi-pref. (JP)

(72) Inventor: Jun Tarui, Kariya (JP)

(73) Assignee: DENSO CORPORATION, Kariya (JP)

(*) Notice: Subject to any disclaimer, the term of this patent is extended or adjusted under 35 U.S.C. 154(b) by 59 days.

(21) Appl. No.: 14/841,946

(22) Filed: Sep. 1, 2015

(65) Prior Publication Data

US 2016/0065100 A1    Mar. 3, 2016

(30) Foreign Application Priority Data

Sep. 2, 2014  (JP) ................. 2014-177961

(51) Int. Cl.
*H02P 1/00* (2006.01)
*H02P 6/18* (2016.01)
*H02P 6/00* (2016.01)
*H02P 6/08* (2016.01)

(52) U.S. Cl.
CPC ............ *H02P 6/18* (2013.01); *H02P 6/002* (2013.01); *H02P 6/08* (2013.01)

(58) Field of Classification Search
CPC ...... H02P 6/04; H02P 6/10; H02P 8/14; H02P 8/18; H02P 21/30; H02P 23/30; H02P 25/089; H02P 25/098
USPC ...................................................... 318/136
See application file for complete search history.

(56) References Cited

U.S. PATENT DOCUMENTS

| 5,410,228 A * | 4/1995 | Shibata .................. H02P 23/16 318/432 |
| 5,598,078 A | 1/1997 | Maeda |
| 5,838,132 A * | 11/1998 | Tanaka .................. G05B 19/39 318/400.11 |
| 5,963,005 A | 10/1999 | Yamaji |
| 8,098,035 B2 * | 1/2012 | Sekimoto .............. H02P 23/30 318/400.15 |
| 2002/0039012 A1 | 4/2002 | Matsuda et al. |
| 2003/0222617 A1* | 12/2003 | Nakai .................... F16H 61/32 318/701 |
| 2005/0218860 A1 | 10/2005 | Kimura et al. |
| 2008/0231220 A1* | 9/2008 | Tsujimoto ............ G03G 15/06 318/476 |
| 2009/0042688 A1 | 2/2009 | Itou et al. |

(Continued)

FOREIGN PATENT DOCUMENTS

| JP | 56-15192 | 2/1981 |
| JP | 63-87198 | 4/1988 |
| JP | 11-187697 | 7/1999 |

(Continued)

*Primary Examiner* — Bickey Dhakal
(74) *Attorney, Agent, or Firm* — Nixon & Vanderhye P.C.

(57) ABSTRACT

A motor control apparatus includes a counter, a margin calculation portion, and a cycle set portion. The counter counts a total number of switching the current supply phase of the coils when the rotor is rotationally driven. A rotation angle of the rotor is detected on a basis of the number of switching. The margin calculation portion calculates a torque margin that is a difference between an output torque of the motor and a load torque acting on the motor. The cycle set portion sets a current supply switching cycle to shorten as the torque margin is greater. The current supply switching cycle is a cycle switching the current supply phase of the coils.

4 Claims, 10 Drawing Sheets

(56) References Cited

U.S. PATENT DOCUMENTS

2009/0091866 A1    4/2009   Inoue et al.
2011/0234127 A1*   9/2011   Fujie .................. H02P 27/06
                                                     318/400.3

FOREIGN PATENT DOCUMENTS

| JP | 2002-354867 | 12/2002 |
| --- | --- | --- |
| JP | 2004-135470 | 4/2004 |
| JP | 2010-284053 | 12/2010 |

* cited by examiner

MOTOR CONTROL APPARATUS

CROSS REFERENCE TO RELATED APPLICATION

This application is based on Japanese Patent Application No. 2014-177961 filed on Sep. 2, 2014, the disclosure of which is incorporated herein by reference.

TECHNICAL FIELD

The present disclosure relates to a motor control apparatus controlling a synchronous motor.

BACKGROUND ART

Patent literature 1: JP 2005-295658 A (corresponding to US 2005/0218860 A1)

A motor rotationally drives a rotor by using a rotation magnetic field generated by switching a current supply phase of a coil of a stator. A synchronous motor needs to switch the current supply phase of the coil, so that a rotation of the rotor is not out of synchronization with the rotation magnetic field. A rotation angle of the rotor is detected by using, for example, an encoder.

When the rotor is rotationally driven, Patent literature 1 counts the number of switching the current supply phase of the coil, and determines a rotation angle of the rotor according to the number of switching. The motor is synchronously controlled while the encoder is eliminated.

The inventor of the present application has found the following.

In Patent literature 1, since the current supply phase of the coil is switched to another in a predetermined cycle, the rotation speed of the rotor remains constant, and it may take time for a rotation position of the rotor to arrive at a target position. Operating time of the motor may become longer.

SUMMARY

It is an object of the present disclosure to provide a motor control apparatus that enable to shorten an operating time of a motor.

According to one aspect of the present disclosure, a motor control apparatus controlling a synchronous motor including a stator that has a plurality of phases of coils and a rotor that rotates upon receiving a magnetic force caused by a rotation magnetic field generated by sequentially switching a current supply phase of the coils is provided. The motor control apparatus includes a counter, a margin calculation portion, and a cycle set portion. The counter counts a total number of switching the current supply phase of the coils when the rotor is rotationally driven. A rotation angle of the rotor is detected on a basis of the number of switching. The margin calculation portion calculates a torque margin that is a difference between an output torque of the motor and a load torque acting on the motor. The cycle set portion sets a current supply switching cycle to shorten as the torque margin is greater. The current supply switching cycle is a cycle switching the current supply phase of the coils.

According to the motor control apparatus, by changing the current supply switching cycle according to a torque margin, it may be possible to increase the rotation speed of the rotor and suppress a loss of synchronism. When the torque margin is relatively large, it may be possible to avoid the loss of the synchronism, even when the current supply switching cycle is shortened and the rotation speed of the rotor increases. Thus, as compared with a case where the current supply switching cycle remains constant, it may be possible to reduce a time required for the rotation position of the rotor to arrive at the target position. It may be possible to reduce the operating time of the motor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be explained with reference to the drawings. The identical symbols are given to elements which are substantially the same elements in the respective embodiments, and repetitive explanation will be omitted.

(First Embodiment)

Figure 1:
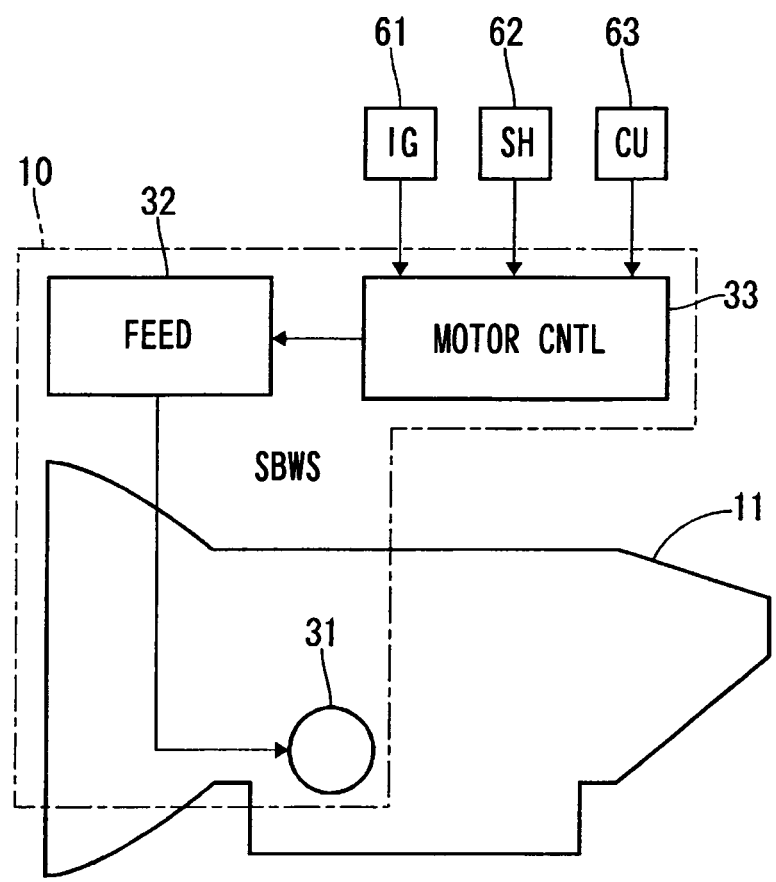
FIG. 1 is a diagram illustrating an outline configuration of a shift-by-wire system in a vehicle using a motor control apparatus according to a first embodiment of the present disclosure.
Figure 2:
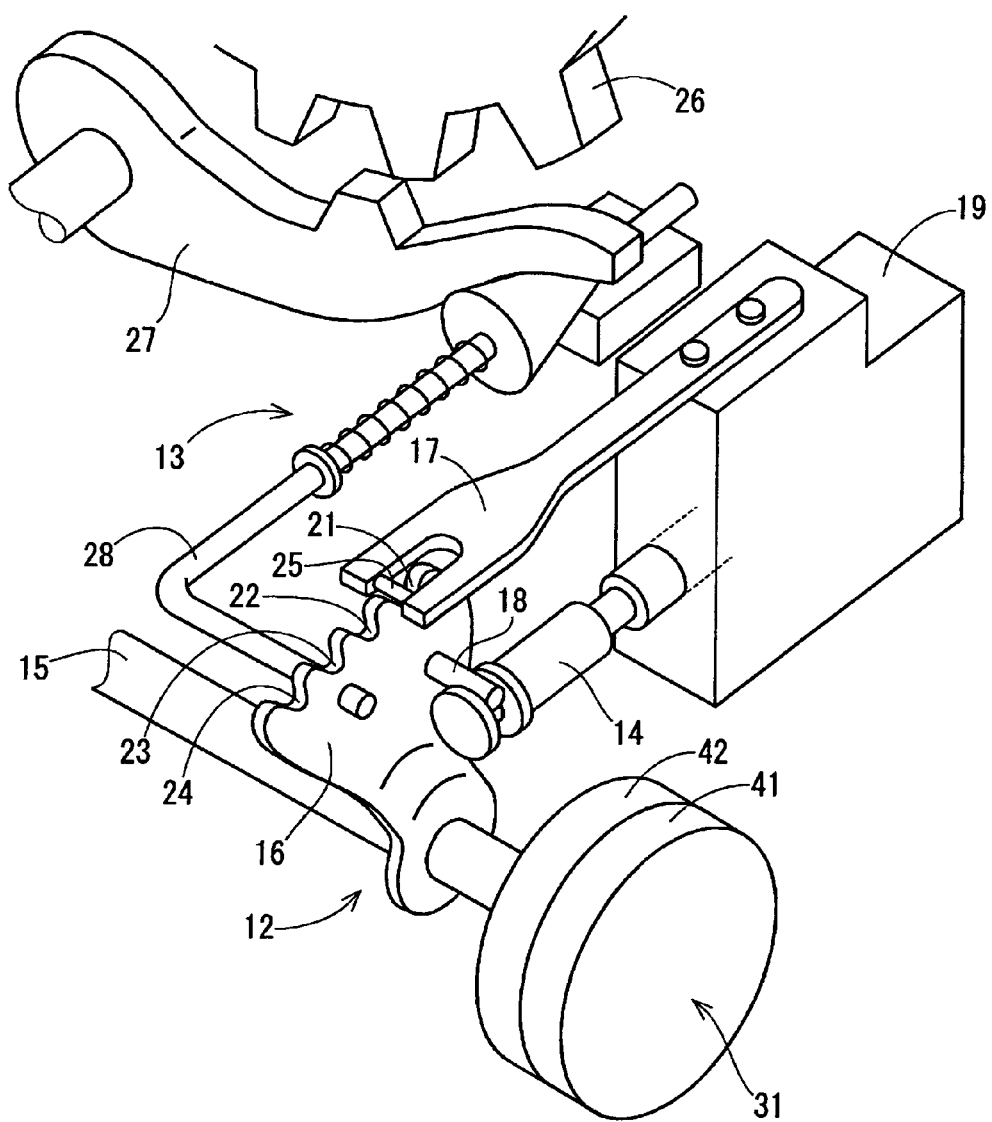
FIG. 2 is a diagram illustrating an outline configuration of a shift range switching mechanism and a parking switching mechanism in an automatic transmission of FIG. 1.

FIG. 1 illustrates a shift-by-wire system in a vehicle using a motor control apparatus according to a first embodiment. The shift-by-wire system includes the motor control apparatus. A shift-by-wire system 10 operates a shift range switching mechanism 12 and a parking switching mechanism 13 as illustrated in FIG. 2 that are mounted in an automatic transmission 11 for the vehicle.

(Configurations of Shift Range Switching Mechanism and Parking Switching Mechanism)

The shift range switching mechanism 12 and the parking switching mechanism 13 will be described with reference to FIG. 2.

The shift range switching mechanism 12 changes a position of a manual spool valve 14 disposed in a hydraulic control circuit of the automatic transmission 11 in an axial direction of the manual spool valve 14 so as to switch the shift range from one position to another. The shift range switching mechanism 12 includes a control rod 15, a detent plate 16, and a flat spring 17.

The control rod 15 is coupled to a rotary actuator 31 of the shift-by-wire system 10. The detent plate 16 rotates integrally with the control rod 15. A component of rotations of the detent plate 16 in an axial direction of the manual spool valve 14 is transmitted to the manual spool valve 14 through a pin 18.

An outer edge of the detent plate 16 includes depressed portions 21, 22, 23, 24 in order from one of a rotation direction. The flat spring 17 has one end fixed to a hydraulic control box 19, and the other end of the flat spring 17 has a locking portion 25 that is engageable with the outer edge of the detent plate 16. The position of the manual spool valve 14 in the axial direction is held by fitting the locking portion 25 into any one of the depressed portions 21-24.

In the present embodiment, a state in which the locking portion 25 is fitted into the depressed portion 21 corresponds to a parking position P of the shift range, a state in which the locking portion 25 is fitted into the depressed portion 22 corresponds to a reverse position R of the shift range, a state in which the locking portion 25 is fitted into the depressed portion 23 corresponds to a neutral position N of the shift range, and a state in which the locking portion 25 is fitted into the depressed portion 24 corresponds to a drive position D of the shift range.

The parking switching mechanism 13 prevents the vehicle from moving by regulating the rotation of an output shaft of the automatic transmission 11. The parking switching mechanism 13 includes a parking gear 26, a parking pole 27, and a parking rod 28. The parking gear 26 rotates integrally with the output shaft. The parking pole 27 is arranged so as to approach or be away from the parking gear 26. When the parking pole 27 comes closer to the parking gear 26 and is engaged with the parking gear 26, the parking pole 27 regulates the rotation of the parking gear 26. The parking rod 28 causes the parking pole 27 to be close to the parking gear 26 at the parking position P. The parking rod 28 causes the parking pole 27 to be away from the parking gear 26 at a position other than the parking position P.

(Configuration of Shift-by-Wire System)

Figure 3:
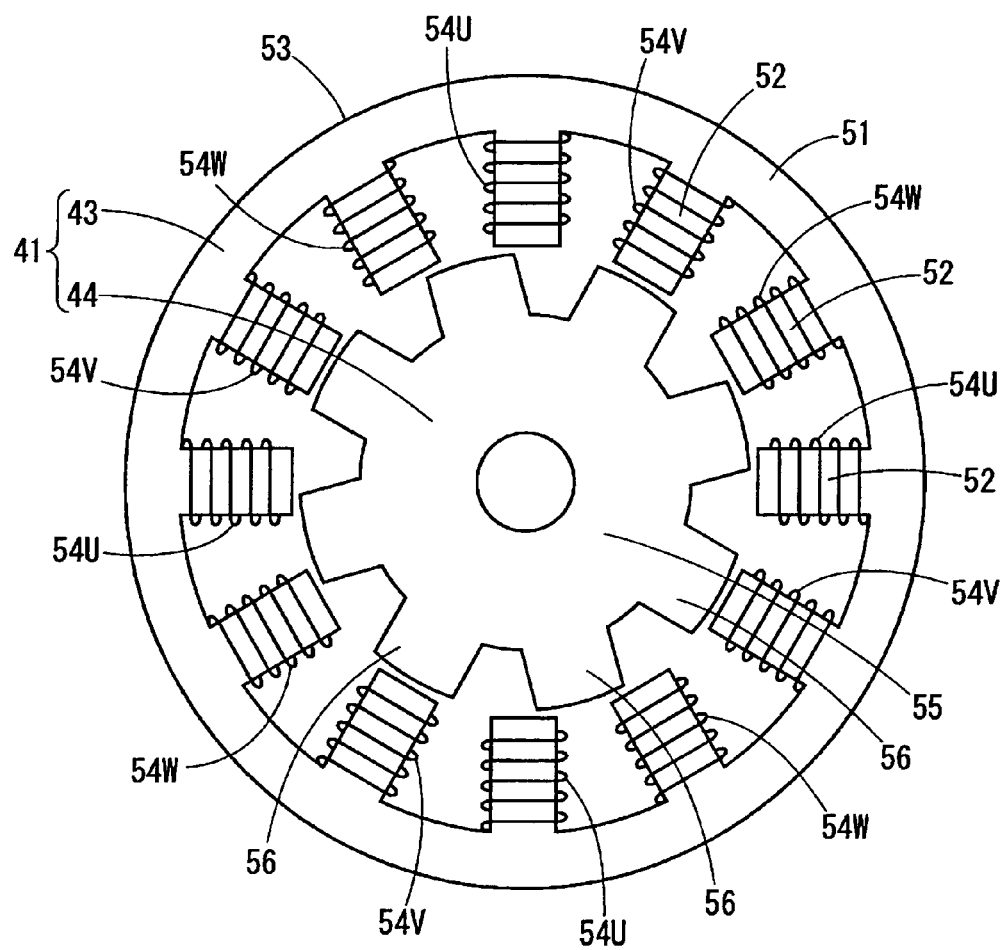
FIG. 3 is a diagram illustrating a motor provided in a rotary actuator in the shift-by-wire system of FIG. 1.

A configuration of the shift-by-wire system 10 will be described with reference to FIGS. 1 to 3.

The shift-by-wire system 10 includes the rotary actuator 31, a feed circuit 32, and a motor control apparatus 33.

The rotary actuator 31 is a geared motor having a motor 41 and a reducer 42 that decelerates and outputs the rotation of the motor 41. In the present embodiment, the reducer 42 is configured from a planetary gear mechanism.

The motor 41 is a synchronous motor. The motor 41 is configured from a switched reluctance motor (a SR motor) as illustrated in FIG. 3. The motor 41 includes a stator 43 and a rotor 44. The stator 43 includes a stator core 53 having an annular yoke portion 51 and multiple tooth portions 52 projected inward from the yoke portion 51, and multiple phases of coils 54U, 54V, 54W wound on the respective tooth portions 52. The rotor 44 includes a cylindrical boss portion 55 and multiple protrusion portions 56 radially protruded from the boss portion 55. The motor 41 rotationally drives the rotor 44 by using a rotation magnetic field generated by switching a current supply phase of the coils 54U, 54V, 54W of the stator 43 to another. Incidentally, the current supply phase may also be referred to as an energization phase.

The feed circuit 32 supplies an electric power to the coils 54U, 54V, 54W.

The motor control apparatus 33 includes a microcomputer (not shown), and is electrically connected to the feed circuit 32 and various sensors. The various sensors include, for example, an ignition switch 61, a shift operation position sensor 62, and a current sensor 63 that detects current values flowing in the coils 54U, 54V, 54W. The motor control apparatus 33 controls the motor 41 on the basis of detection signals from the various sensors.

The microcomputer includes, for example, a CPU, a volatile memory, and a non-volatile memory, so that the motor control apparatus 33 perform a flowchart described later.

(Configuration of Motor Control Apparatus)

A configuration of the motor control apparatus 33 will be described with reference to FIGS. 1, 4 to 9.

The motor control apparatus 33 rotationally drives the rotor 44 by using a rotation magnetic field generated by sequentially switching a current supply phase of the coils 54U, 54V, 54W. In other words, the motor control apparatus 33 sequentially switching a current supply phase of the coils 54U, 54V, 54W to generate the rotation magnetic field, and rotationally drives the rotor 44 with the rotation magnetic field. In this situation, the motor control apparatus 33 counts the number of switching the current supply phase, and determines a rotation angle of the rotor 44 on the basis of the number of switching. The number of switching the current supply phase may be also referred to as a frequency of switching of the current supply phase. Accordingly, the motor control apparatus 33 synchronously controls the motor 41 while the encoder is eliminated.

In a comparative example, since a current supply phase of a coil is switched to another in a predetermined cycle, rotation speed of a rotor remains constant, and it takes time for a rotation position of the rotor to arrive at a target position. It takes longer operating time of the motor.

The motor control apparatus 33 according to the present embodiment executes processing illustrated in FIGS. 4 to 7 so as to reduce the operating time of the motor 41.

Figure 4:
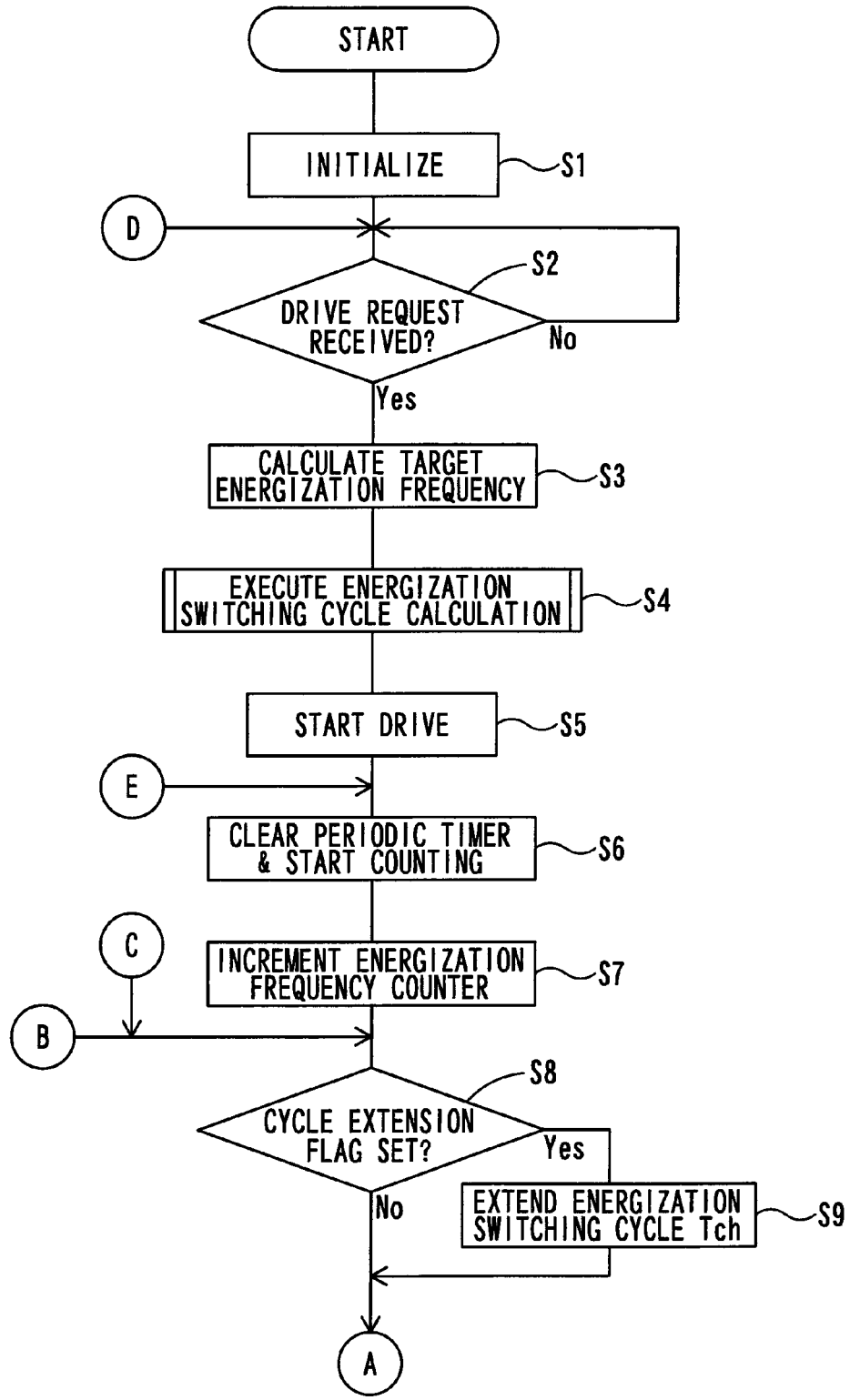
FIG. 4 is a flowchart illustrating a process synchronously controlling a motor by the motor control apparatus in FIG. 1.

When a flowchart of FIG. 4 starts so as to synchronously control the motor 41, an initializing process such as learning of an excitation phase and position learning of the control rod 15 is performed at S1. After S1, the process shifts to S2. At the end of S1, a specific phase of the coils 54 is supplied with current.

At S2, it is determined whether the motor control apparatus receives a drive request. Specifically, when a detection signal from the shift operation position sensor 62 changes, it is determined that there is the drive request. When the determination at S2 is positive (S2: YES), the process shifts to S3. When the determination at S2 is negative (S2: NO), the process returns to S2.

At S3, a target current supply frequency that is a target value of the number of a current supply phase switching is calculated according to a difference between a present rotation position of the control rod 15 and a target rotation position. After S3, the process shifts to S4. Incidentally, the target current supply frequency may be also referred to as a target number of current supply.

Figure 6:
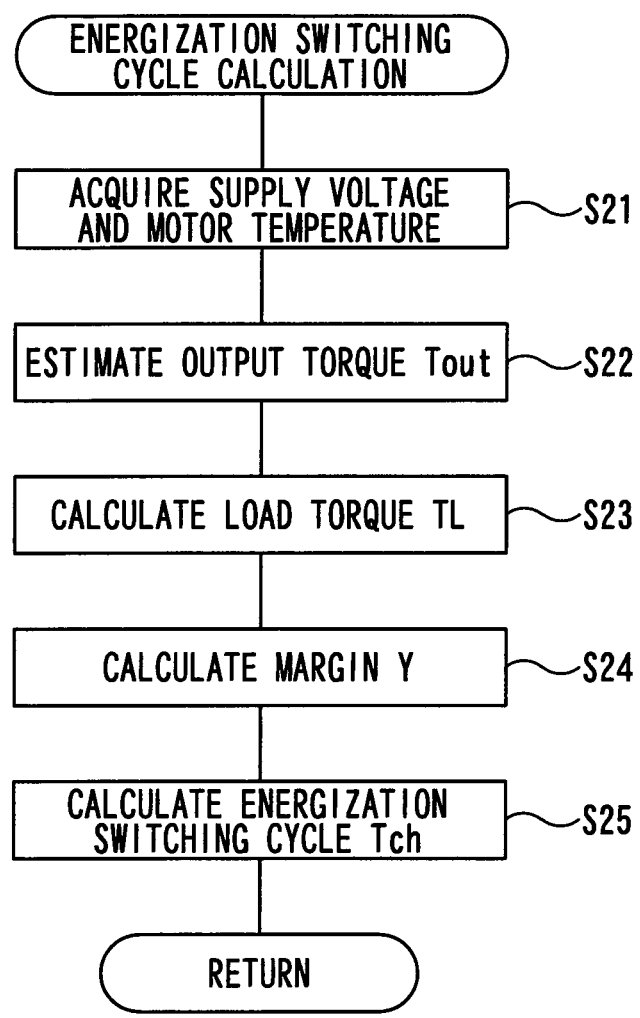
FIG. 6 is a flowchart illustrating a process calculating a current supply switching cycle in the process illustrated in FIG. 4.

At S4, a process in a flowchart illustrated in FIG. 6 is executed to calculate a current supply switching cycle Tch that is a cycle in which the current supply phase is switched to another. In the present embodiment, the "cycle in which the current supply phase is switched to another" means an interval of timing when a current supply state of the coils 54U, 54V, 54W of the respective phases is changed to a non-current-supply state (that is, a state in which current supply is stopped).

When the process described in FIG. 6 starts, a supply voltage and a temperature of the motor 41 are acquired at S21. After S21, the process shifts to S22.

At S22, an output torque Tout of the motor 41 is estimated on the basis of the supply voltage and the temperature of the motor 41. After S22, the process shifts to S23.

At S23, a load torque TL of the motor 41 is calculated on the basis of the rotation position of the control rod 15. A relationship between the rotation position of the control rod 15 and the load torque TL of the motor 41 is determined according to a shape (depressed portions 21 to 24) of the detent plate 16 in advance. After S23, the process shifts to S24.

Figure 8:
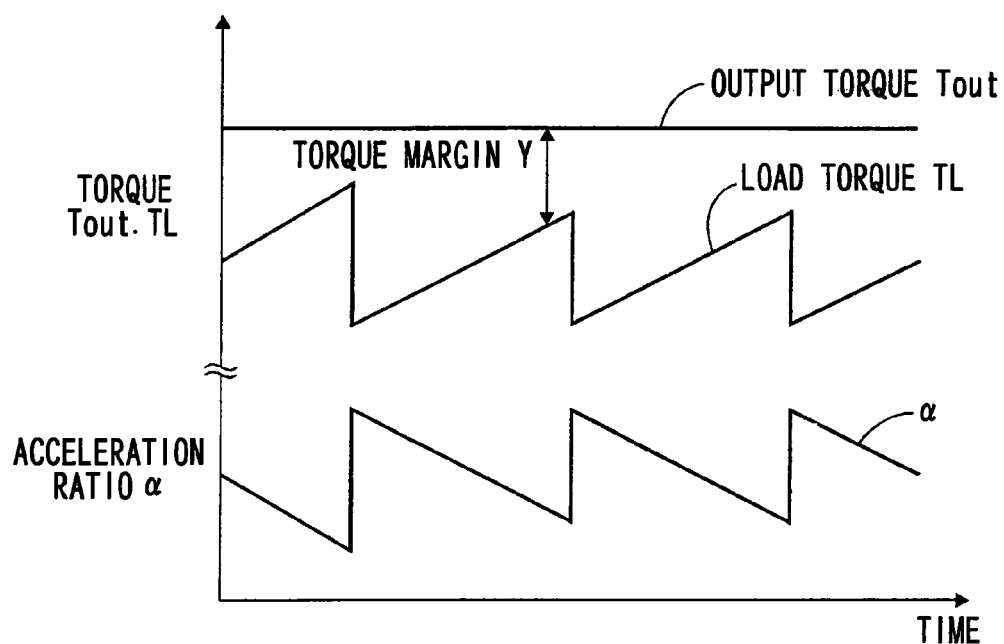
FIG. 8 is a time chart illustrating a time series variation in an output torque of the motor, a load torque of the motor, and an acceleration rate when the shift range of the automatic transmission changes from a parking position to a drive position.

At S24, a torque margin Y that is a difference between the output torque Tout and the load torque TL is calculated. As illustrated in FIG. 8, the torque margin Y changes with an increase or decrease of the load torque TL corresponding to the rotation position of the control rod 15. In the cycle illustrated in FIG. 8, the output torque Tout remains constant. After S24, the process shifts to S25.

Incidentally, S24 may correspond to an example of a margin calculation portion.

At S25, the current supply switching cycle Tch is calculated on the basis of the torque margin Y. The current supply switching cycle Tch is set to shorten as the torque margin Y is greater. For example, when a value obtained by dividing the present value of the current supply switching cycle Tch by a next value is an acceleration ratio α, the next value is determined so that the acceleration ratio α is in proportion to the torque margin Y as illustrated in FIG. 8. After S25, the process returns to the main flowchart.

Incidentally, S25 may correspond to an example of a cycle set portion.

The rotation drive of the motor 41 starts at S5 in FIG. 4. For example, a phase that is supplied with current subsequent to the present current supply phase (corresponding to an initial current supply phase) is supplied with current. The current supply state of the initial current supply phase changes to a non-current-supply state after a time half of the current supply switching cycle Tch elapses from the current supply start time. After S5, the process shifts to S6. Hereinafter, although not shown, it is supposed that the current supply of a next phase to be supplied with current starts when the time half of the current supply switching cycle Tch elapses.

At S6, a cycle timer (also referred to as a periodic time), which is cleared, starts counting. After S6, the process shifts to S7.

At S7, a current supply frequency counter is incremented. After S7, the process shifts to S8. S7 may correspond to an example of a counter.

At S8, it is determined whether a cycle extension flag is set. When the determination at S8 is positive (S8: YES), the process shifts to S9. When the determination at S8 is negative (S8: NO), the process shifts to S10.

At S9, the current supply switching cycle Tch is extended for a predetermined time. After S9, the process shifts to S10.

Figure 5:
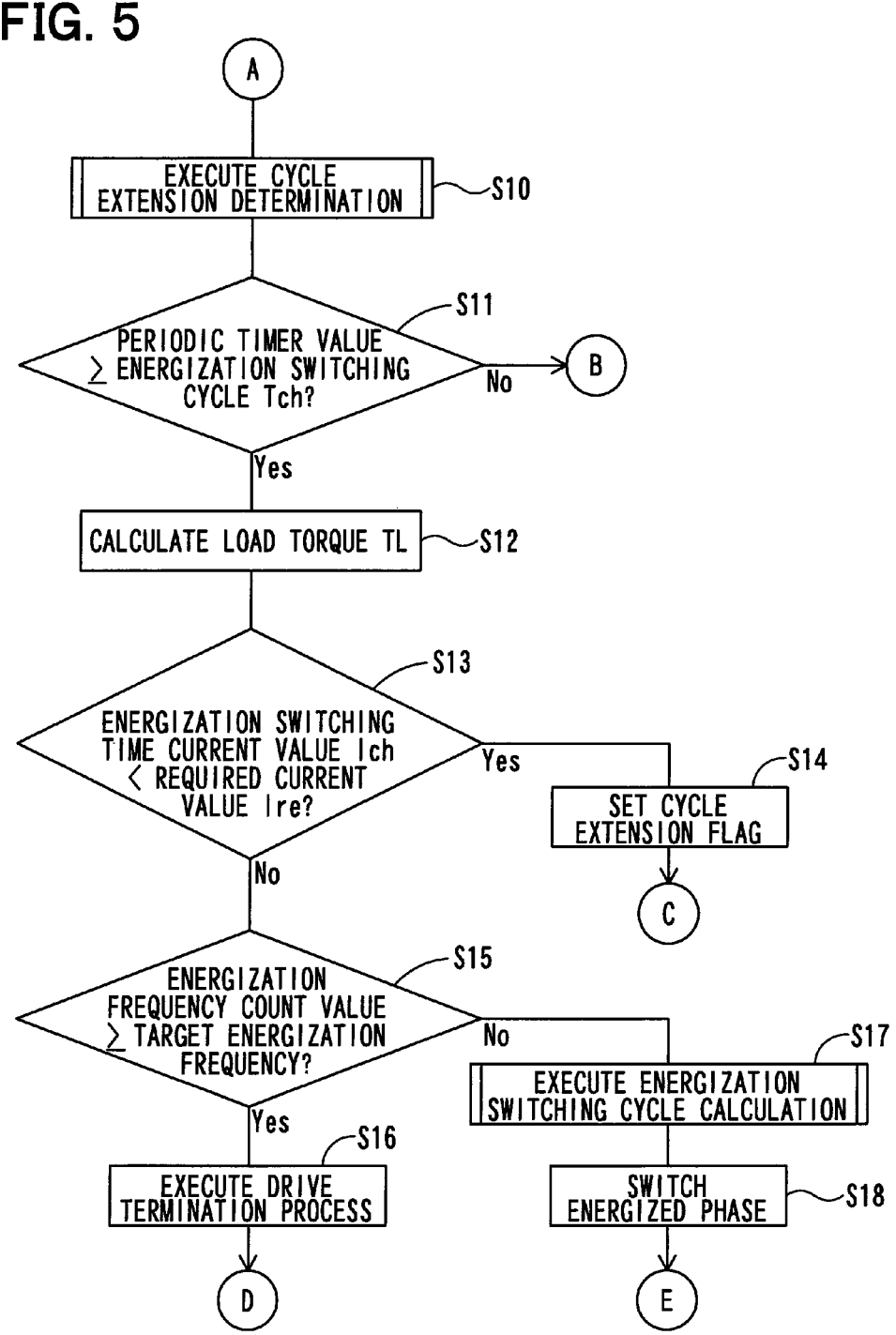
FIG. 5 is a flowchart illustrating the process synchronously controlling the motor by the motor control apparatus in FIG. 1.
Figure 7:
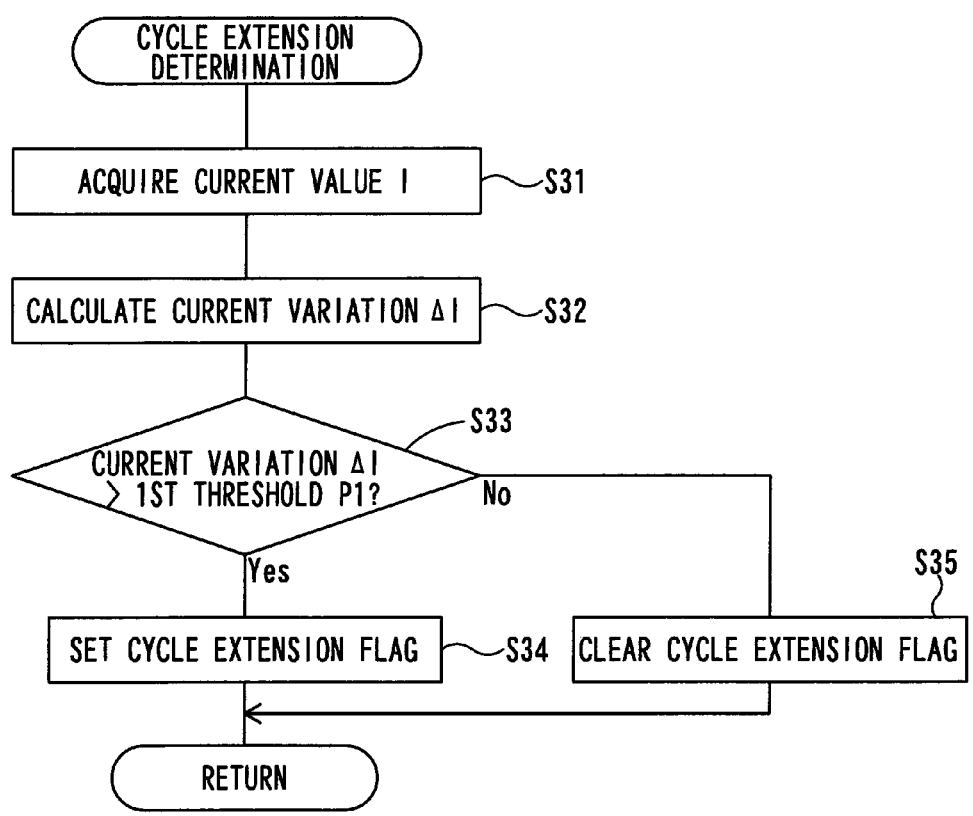
FIG. 7 is a flowchart illustrating a sub-process determining an extension of the current supply switching cycle in the process illustrated in FIG. 4.

At S10 of FIG. 5, a process in a flowchart illustrated in FIG. 7 is executed so as to determine an extension of the current supply switching cycle Tch.

When the process in FIG. 7 starts, an actual current value I flowing in the energized coil 54 is acquired at S31. After S31, the process shifts to S32. An energized coil means a coil supplied with current, and corresponds to a coil during current supply.

At S32, a current variation ΔI that is a variation in the current value I per predetermined time is calculated. After S32, the process shifts to S33.

At S33, it is determined whether the current variation ΔI is greater than a predetermined first threshold P1. When the determination at S33 is positive (S33: YES), the process shifts to S34. When the determination at S34 is negative (S34: NO), the process shifts to S35.

At S34, the cycle extension flag is set. The cycle extension flag is cleared at S35. After S34 or after S35, the process returns to the main flowchart.

At S11 of FIG. 5, it is determined whether a cycle timer value (also referred to as a periodic timer value) is equal to or greater than the current supply switching cycle Tch. When the determination at S11 is positive (S11: YES), the process shifts to S12. When the determination at S11 is negative (S11: NO), the process shifts to S8.

At S12, the load torque TL is calculated. After S12, the process shifts to S13.

Figure 9:
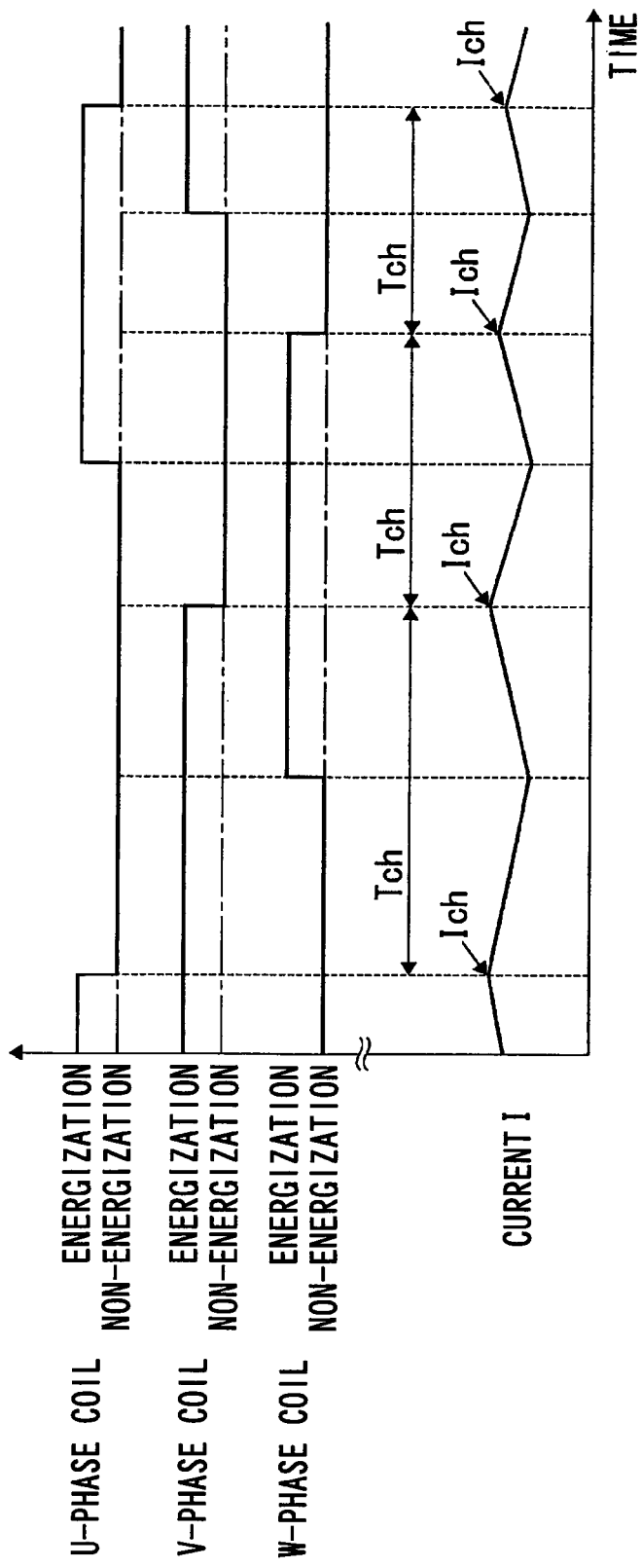
FIG. 9 is a time chart illustrating a time series variation of current supply states of a U-phase coil, a V-phase coil, and a W-phase coil of coils in the motor, and a current value flowing in the energized coils.

It is supposed that a switching-time current value Ich is the current value I flowing in the energized coil 54 at the time when the current supply switching cycle Tch elapses and the current supply phase is switched to another (referring to FIG. 9). In this case, at S13 it is determined whether the switching-time current value Ich is less than a required current value Ire represented by a product of the load torque TL and a predetermined coefficient K. When the determination at S13 is positive (S13: YES), the process shifts to S14. When the determination at S13 is negative (S13: NO), the process shifts to S15.

For example, the motor control apparatus 33 may calculate the required current value Ire.

At S14, the cycle extension flag is set. After S14, the process shifts to S8.

At S15, it is determined whether the count value of the current supply frequency counter is equal to or greater than a target current supply frequency. When the determination at S15 is positive (S15: YES), the process shifts to S16. When the determination at S15 is negative (S15: NO), the process shifts to S17.

At S16, a termination process of the rotation drive of the motor 41 is performed. In this situation, the cycle extension flag, the cycle timer, and the current supply frequency counter are cleared. After S16, the process shifts to S2.

At S17, a process in a flowchart illustrated in FIG. 6 is executed so as to calculate the current supply switching cycle Tch. After S17, the process shifts to S18.

At S18, the current supply phase is switched to another. After S18, the process shifts to S6.

As described above, in the first embodiment, the motor control apparatus 33 calculates the torque margin Y that is a difference between the output torque Tout of the motor 41 and the load torque TL, and sets the current supply switching cycle Tch to be shorter as the torque margin Y is greater.

By changing the current supply switching cycle Tch according to the torque margin Y, it may be possible to increase the rotation speed of the rotor 44 while step-out is suppressed. In other words, when the torque margin Y is relatively large, it may be possible to prevent step-out even when the current supply switching cycle Tch is shortened and the rotation speed of the rotor 44 increases. As compared with a case in which the current supply switching cycle Tch remains constant, it may be possible to reduce a time required for the rotation position of the rotor 44 to arrive at the target position. Therefore, according to the present embodiment, it may be possible to reduce the operating time of the motor 41.

The motor control apparatus 33 determines the next value so that the acceleration ratio α, which is a value obtained by dividing the present value of the current supply switching cycle Tch by the next value, is in proportion to the torque margin Y.

According to this configuration, it may be possible to set the current supply switching cycle Tch to be shorter as the torque margin Y is greater.

When the current variation ΔI that is a variation of the current value I per predetermined time is greater than the predetermined first threshold P1, the motor control apparatus 33 prolongs the current supply switching cycle Tch by a predetermined time.

According to this configuration, it may be possible to finely adjust the current supply switching cycle Tch to an appropriate value, so that step-out does not occur.

When the switching-time current value Ich, which is the current value flowing in the coil 54 at the time when the current supply switching cycle Tch elapses to switch the current supply phase to another, is less than the required current value Ire represented by the product of the load torque TL and the predetermined coefficient K, the motor control apparatus 33 prolongs the current supply switching cycle Tch by the predetermined time.

According to this configuration, it may be possible to finely adjust the current supply switching cycle Tch to an appropriate value so that step-out does not occur.

(Second Embodiment)

A motor control apparatus in a second embodiment will be described with reference to FIG. 10. It should be noted that FIG. 10 omits processes before S10 and after S11 of FIG. 5.

Figure 10:
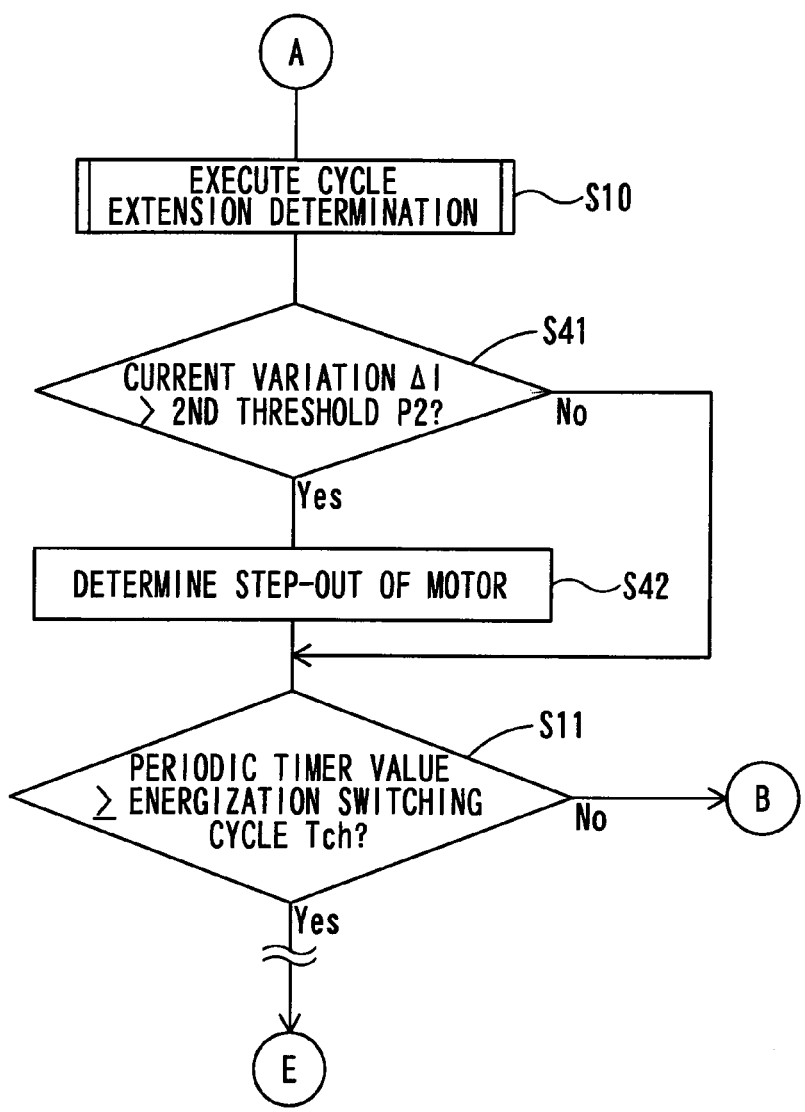
FIG. 10 is a flowchart illustrating a process synchronously controlling a motor by a motor control apparatus according to a second embodiment.

As illustrated in FIG. 10, At S41 after S10, it is determined whether the current variation ΔI is greater than a predetermined second threshold P2. The second threshold P2 is greater than the first threshold P1. When the determination at S41 is positive (S41: YES), the process shifts to S42. When the determination at S41 is negative (S41: NO), the process shifts to S11.

At S42, the step-out of the motor 41 is determined, and a recovery process is performed. After S42, the process shifts to S11.

As described above, in the second embodiment, when the current variation ΔI is greater than the second threshold P2, it is determined that the motor 41 is stepped out.

According to this configuration, it may be possible to determine the step-out, and it may be possible to perform the recovery process so as to prevent the control rod 15 from stopping an intermediate position which does not arrive at a target position.

(Another Embodiment)

In another embodiment of the present disclosure, the acceleration ratio may not be in proportion to the torque margin. For example, a relationship between the acceleration ratio and the torque margin may be represented by a quadratic function or an exponential function.

In another embodiment, the processes at S8 and S9 of FIGS. 4 and S10 and S13 of FIG. 5 may not be performed.

In another embodiment, when the current variation is equal to or less than the first threshold, and the switching-time current value is equal to or greater than the required current value, the next value of the current supply switching cycle may be reduced.

In another embodiment, the motor is not limited to the SR motor, but may be another synchronous motor.

In another embodiment, the motor may be used in any apparatus other than the shift-by-wire system for the vehicle.

It is noted that a flowchart or a processing of the flowchart in the present application includes steps (also referred to as sections), each of which is represented, for example, as S1. Further, each step may be divided into several sub-steps, and several steps may be combined into a single step.

While the motor control apparatus has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control apparatus controlling a synchronous motor including a stator that has a plurality of phases of coils and a rotor that rotates upon receiving a magnetic force caused by a rotation magnetic field generated by sequentially switching a current supply phase of the coils, the motor control apparatus comprising:
    a microcomputer configured to include:
        (i) a counter counting a total number of switching the current supply phase of the coils when the rotor is rotationally driven, wherein a rotation angle of the rotor is detected on a basis of the number of switching;
        (ii) a margin calculation portion calculating a torque margin that is a difference between an output torque of the motor and a load torque acting on the motor; and
        (iii) a cycle set portion setting a current supply switching cycle to shorten as the torque margin is greater, wherein the current supply switching cycle is a cycle switching the current supply phase of the coils, wherein:
    the cycle portion decides a next value of the current supply switching cycle, the next value of the current supply switching cycle being decided by dividing a present value of the current supply switching cycle by the torque margin; and
    the motor control apparatus does not use an encoder.

2. The motor control apparatus according to claim 1, wherein:
    a current variation is a variation of a current value flowing in the coils during current supply per a predetermined time; and
    when the current variation is greater than a predetermined first threshold, the motor control apparatus extends the current supply switching cycle.

3. The motor control apparatus according to claim 2, wherein:
    a predetermined second threshold is a value greater than the predetermined first threshold; and
    when the current variation is greater than the predetermined second threshold, the motor control apparatus determines that the motor steps out.

4. The motor control apparatus according to claim 1, wherein:
    a switching-time current value is the current value flowing in the coils during current supply at a time when the current supply switching cycle elapses and the current supply phases of the coils are switched;

a required current value is calculated by the motor control apparatus on a basis of the load torque; and when the switching-time current value is less than the required current value, the motor control apparatus extends the current supply switching cycle.

* * * * *